US011105622B2

(12) United States Patent
Pan (10) Patent No.: US 11,105,622 B2
(45) Date of Patent: Aug. 31, 2021

(54) DUAL BAROMETER SYSTEMS FOR IMPROVED ALTITUDE ESTIMATION

(71) Applicant: SZ DJI TECHNOLOGY CO., LTD., Shenzhen (CN)

(72) Inventor: Guoxiu Pan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 295 days.

(21) Appl. No.: 15/993,927

(22) Filed: May 31, 2018

(65) Prior Publication Data
US 2018/0274919 A1 Sep. 27, 2018

Related U.S. Application Data

(63) Continuation of application No. PCT/CN2015/096319, filed on Dec. 3, 2015.

(51) Int. Cl.
*G01C 5/06* (2006.01)

(52) U.S. Cl.
CPC ........................ *G01C 5/06* (2013.01)

(58) Field of Classification Search
CPC ........................................... G01C 5/06
See application file for complete search history.

(56) References Cited

U.S. PATENT DOCUMENTS

| 2011/0264314 | A1* | 10/2011 | Parras | G05D 1/0676 |
| | | | | 701/16 |
| 2012/0265373 | A1* | 10/2012 | Ingvalson | G01C 21/20 |
| | | | | 701/4 |
| 2013/0325385 | A1* | 12/2013 | Shin | G01C 5/06 |
| | | | | 702/94 |
| 2014/0135040 | A1* | 5/2014 | Edge | G01C 5/06 |
| | | | | 455/456.6 |
| 2015/0133145 | A1* | 5/2015 | Palanki | G01C 25/00 |
| | | | | 455/456.1 |
| 2015/0134143 | A1* | 5/2015 | Willenborg | G05D 1/0094 |
| | | | | 701/2 |
| 2015/0233713 | A1 | 8/2015 | Wolf | |

(Continued)

FOREIGN PATENT DOCUMENTS

| CN | 1324191 A | 11/2001 |
| CN | 101379367 A | 3/2009 |

(Continued)

OTHER PUBLICATIONS

The World Intellectual Property Organization (WIPO) International Search Report and Written Opinion for PCT/CN2015/096319 dated Aug. 30, 2016 8 Pages.

(Continued)

*Primary Examiner* — Mohammad K Islam
(74) *Attorney, Agent, or Firm* — Anova Law Group, PLLC (57) ABSTRACT

An apparatus for determining an altitude of a mobile unit includes one or more processors individually or collectively configured to obtain local measurement data comprising a local atmospheric pressure at a location of the mobile unit, obtain reference measurement data comprising a reference atmospheric pressure at a location of a reference unit that is movable, and determine the altitude of the mobile unit based on the local measurement data and the reference measurement data.

19 Claims, 7 Drawing Sheets

(56) References Cited

U.S. PATENT DOCUMENTS

| | | | |
|---|---|---|---|
| 2015/0247917 A1 | 9/2015 | Gum et al. | |
| 2015/0319578 A1 | 11/2015 | Edge et al. | |
| 2016/0091385 A1* | 3/2016 | Heshmati | G01L 27/005 |
| | | | 73/1.57 |
| 2016/0356875 A1* | 12/2016 | Wolf | G01S 5/0236 |
| 2017/0225921 A1* | 8/2017 | Scoville | B66B 5/0018 |
| 2018/0094998 A1* | 4/2018 | Youssef | G01L 27/005 |

FOREIGN PATENT DOCUMENTS

| | | |
|---|---|---|
| CN | 101512376 A | 8/2009 |
| CN | 102620716 A | 8/2012 |
| CN | 103134473 A | 6/2013 |
| CN | 103636142 A | 3/2014 |
| CN | 104208865 A | 12/2014 |
| CN | 104567799 A | 4/2015 |
| CN | 104870936 A | 8/2015 |
| CN | 104903681 A | 9/2015 |
| CN | 106215405 A | 12/2016 |
| CN | 106605180 A | 4/2017 |
| CN | 106772496 A | 5/2017 |
| EP | 1312891 A2 | 5/2003 |
| JP | 2005195534 A | 7/2005 |
| WO | 2015127318 A1 | 8/2015 |
| WO | 2015131149 A1 | 9/2015 |

OTHER PUBLICATIONS

Hongjun Zhu, Altitude Measurement System Based on Pressure Sensor Design, Journal of Civil Aviation Flight University of China, Jul. 2015, pp. 67-70, vol. 26, No. 4, China.

* cited by examiner

DUAL BAROMETER SYSTEMS FOR IMPROVED ALTITUDE ESTIMATION

CROSS-REFERENCE TO RELATED APPLICATION

This application is a continuation of International Application No. PCT/CN2015/096319, filed on Dec. 3, 2015, the entire contents of which are incorporated herein by reference.

BACKGROUND

Altitude estimation is important in many applications, such as personal navigation or aviation. Accurate estimation of altitude is particularly important for unmanned aerial vehicles, which often use estimated altitude information as feedback in controlling navigation, without the benefit of visual confirmations of the vehicle's position by the operator of the vehicle. One commonly used sensor for estimating altitude is a barometer. A barometer does not directly measure altitude, but measures atmospheric pressure, which can be converted to altitude based on empirically derived correlations between atmospheric pressure and altitude.

However, barometer systems for altitude estimation can be prone to errors, due to factors other than altitude that can affect atmospheric pressure. In particular, weather conditions can lead to significant fluctuations in atmospheric pressure at a given altitude, resulting in unreliable altitude estimations based on atmospheric pressure.

SUMMARY

A need exists for improved barometer systems for estimating the altitude of a mobile unit. In particular, a need exists for barometer systems that can compensate for the effects of variable weather conditions on altitude estimation, and that are compact, simple to implement, and yet highly accurate, reliable, and flexible. The present disclosure describes dual barometer systems and methods of use thereof for improved altitude estimation. A dual barometer system as described herein comprises a mobile unit and a reference unit, each having a barometric pressure sensor. The barometric pressure sensor at the mobile unit can measure the local atmospheric pressure at the location of the mobile unit, while the barometric pressure sensor at the reference unit can measure the reference atmospheric pressure at the location of the reference unit. The mobile unit and the reference unit can be configured to remain within a predetermined operational distance from one another throughout operation of the mobile unit, for example such that the reference unit is subject to substantially similar weather conditions as the mobile unit throughout operation of the mobile unit. Therefore, the barometric pressure sensor at the reference unit can be subject to substantially similar effects of weather on atmospheric pressure measurement as the barometric pressure sensor at the mobile unit. The altitude of the mobile unit may be determined based on both the local and reference atmospheric pressure measurements, wherein the reference atmospheric pressure measurement is used to correct the estimation of altitude of the mobile unit based on the local atmospheric pressure measurement.

In one aspect, an apparatus for determining an altitude of a mobile unit comprises one or more processors, individually or collectively configured to obtain local measurement data comprising local atmospheric pressure at a location of the mobile unit. The one or more processors are further configured to obtain reference measurement data comprising reference atmospheric pressure at a location of a reference unit. The one or more processors are further configured to determine the altitude of the mobile unit based on the local measurement data and the reference measurement data.

In any embodiment of the apparatus, the local measurement data may comprise a local altitude determined based on the local atmospheric pressure, and the reference measurement data may comprise a reference altitude determined based on the reference atmospheric data. The one or more processors may be configured to determine the altitude of the mobile unit by adjusting the local altitude based on the reference altitude.

In any embodiment of the apparatus, the one or more processors may be further configured to adjust the local measurement data based on the reference measurement data, and determine the altitude of the mobile unit based on the adjusted local measurement data.

In another aspect, a method to determine an altitude of a mobile unit comprises obtaining local measurement data comprising local atmospheric pressure at a location of the mobile unit. The method further comprises obtaining reference measurement data comprising reference atmospheric pressure at a location of a reference unit. The method further comprises determining the altitude of the mobile unit based on the local measurement data and the reference measurement data.

In any embodiment of the method, the local measurement data may comprise a local altitude determined based on the local atmospheric pressure, and the reference measurement data may comprise a reference altitude determined based on the reference atmospheric data. Determining the altitude of the mobile unit may comprise adjusting the local altitude based on the reference altitude.

In any embodiment of the method, the method may further comprise adjusting the local measurement data based on the reference measurement data, and determining the altitude of the mobile unit based on the adjusted local measurement data.

In any embodiment of the apparatus or method for determining an altitude of a mobile unit, the reference unit may be movable. The reference unit may be movable to remain within a predetermined horizontal distance from the mobile unit. The reference unit may be positioned by a user of the mobile unit within the predetermined horizontal distance from the mobile unit. Alternatively or in combination, the reference unit may be configured to move automatically to remain within the horizontal predetermined distance from the mobile unit.

In any embodiment of the apparatus or method for determining an altitude of a mobile unit, the reference unit may comprise a remote controller configured to control operation of the mobile unit. The remote controller may be configured to control operation of the mobile unit from within a predetermined horizontal distance of the mobile unit. The remote controller may be configured to transmit operational commands to the mobile unit only within the predetermined distance, such that the mobile unit is unable to travel beyond the predetermined distance from the remote controller. The remote controller may be configured to transmit operational commands to the mobile unit via a wireless connection, wherein the remote controller and the mobile unit may be configured to transmit measurement data to and from one another via the same wireless connection. The remote controller may be configured to control operation of a plurality of mobile units, and an altitude of each of the plurality of mobile units may be determined based on the local measurement data generated at each mobile unit, and the reference measurement data generated at the remote controller.

In any embodiment of the apparatus or method for determining an altitude of a mobile unit, the local measurement data may comprise the local atmospheric pressure at one or more local measurement time points, and the reference measurement data may comprise the reference atmospheric pressure at one or more reference measurement time points corresponding to the one or more local measurement time points. The one or more processors may be configured to determine the altitude of the mobile unit at each of the one or more local measurement time points, based on the local measurement data at the local measurement time point and the reference measurement data at a reference measurement time point corresponding to the local measurement time point. The local measurement data may comprise the local atmospheric pressure at a plurality of local measurement time points, and the reference measurement data may comprise the reference atmospheric pressure at a plurality of reference measurement time points corresponding to the plurality of local measurement time points. Each local measurement time point may be substantially synchronized with each corresponding reference measurement time point.

In any embodiment of the apparatus or method for determining an altitude of a mobile unit, the mobile unit may comprise a local barometric pressure sensor configured to measure the local atmospheric pressure, and the reference unit may comprise a reference barometric pressure sensor configured to measure the reference atmospheric pressure.

In any embodiment of the apparatus or method for determining an altitude of a mobile unit, the local measurement data may further comprise local temperature at the location of the mobile unit, and the reference measurement data may further comprise reference temperature at the location of the reference unit. The mobile unit may comprise a local temperature sensor configured to measure the local temperature, and the reference unit may comprise a reference temperature sensor configured to measure the reference temperature.

In any embodiment of the apparatus or method for determining an altitude of a mobile unit, the local measurement data may further comprise a position of the mobile unit. The mobile unit may comprise a global positioning system configured to measure the position of the mobile unit.

In any embodiment of the apparatus or method for determining an altitude of a mobile unit, the mobile unit and the reference unit may be configured to transmit data to or receive data from one another via a wireless connection. The wireless connection may comprise a private, direct communication connection between the mobile unit and the reference unit. The direct communication connection may be encrypted, for example, using coded orthogonal frequency-division multiplexing. The wireless connection may comprise one or more of a cellular communication network, a wireless serial communication link, or an Internet or Internet-based network. The mobile unit and the reference unit may be configured to transmit data to or receive data from one another in real time, and the one or more processors may be configured to instantaneously determine the altitude of the mobile unit.

In any embodiment of the apparatus or method for determining an altitude of a mobile unit, the mobile unit and the reference unit may be configured to generate the local and reference measurement data and determine the altitude of the mobile unit periodically at predetermined intervals during movement of the mobile unit. Alternatively or in combination, in any embodiment of the apparatus, the mobile unit and the reference unit may be configured to generate the local and reference measurement data and determine the altitude of the mobile unit at user request.

In any embodiment of the apparatus or method for determining an altitude of a mobile unit, the mobile unit may be an unmanned aerial vehicle.

In another aspect, a mobile unit comprises a barometric pressure sensor configured to measure local atmospheric pressure at a location of the mobile unit and thereby generate local measurement data. The mobile unit further comprises a communication module configured to receive reference measurement data from a reference unit, wherein the reference measurement data comprises reference atmospheric pressure at a location of the reference unit. The mobile unit further comprises one or more processors, individually or collectively configured to obtain local measurement data comprising local atmospheric pressure at a location of the mobile unit, obtain reference measurement data comprising reference atmospheric pressure at a location of a reference unit, and determine the altitude of the mobile unit based on the local measurement data and the reference measurement data.

In another aspect, a reference unit comprises a barometric pressure sensor configured to measure reference atmospheric pressure at a location of the reference unit and thereby generate reference measurement data. The reference unit further comprises a communication module configured to receive local measurement data from a mobile unit, wherein the local measurement data comprises local atmospheric pressure at a location of the mobile unit. The reference unit further comprises one or more processors, individually or collectively configured to obtain local measurement data comprising local atmospheric pressure at a location of the mobile unit, obtain reference measurement data comprising reference atmospheric pressure at a location of a reference unit, and determine the altitude of the mobile unit based on the local measurement data and the reference measurement data.

In any embodiment of the mobile unit or the reference unit, the reference unit may be movable.

In any embodiment of the mobile unit or the reference unit, the reference unit may comprise a remote controller configured to control operation of the mobile unit.

In any embodiment of the mobile unit or the reference unit, the local measurement data may comprise the local atmospheric pressure at one or more local measurement time points, and the reference measurement data may comprise the reference atmospheric pressure at one or more reference measurement time points corresponding to the one or more local measurement time points. The one or more processors may be configured to determine the altitude of the mobile unit at each of the one or more local measurement time points, based on the local measurement data at the local measurement time point and the reference measurement data at a reference measurement time point corresponding to the local measurement time point.

In any embodiment of the mobile unit or the reference unit, the communication module may be further configured to transmit the determined altitude from the mobile unit to the reference unit or from the reference unit to the mobile unit.

In another aspect, a server comprises one or more processors, individually or collectively configured to obtain local measurement data comprising local atmospheric pressure at a location of the mobile unit, obtain reference measurement data comprising reference atmospheric pressure at a location of a reference unit, and determine the altitude of the mobile unit based on the local measurement data and the reference measurement data. The server further comprises a communication module configured to (1) receive the local measurement data from the mobile unit and the reference measurement data from the reference unit and (2) transmit the determined altitude of the mobile unit to one or both of the mobile unit and the reference unit.

In any embodiment of the server, the server may be configured to receive the local and reference measurement data in real time, and instantaneously determine and transmit the altitude of the mobile unit to one or both of the mobile unit and the reference unit.

It shall be understood that different aspects of the disclosure can be appreciated individually, collectively, or in combination with each other. Various aspects of the disclosure described herein may be applied to any of the particular applications set forth below or for any other types of mobile units. Any description herein of an aerial vehicle may apply to and be used for any mobile, such as any vehicle. Additionally, the devices and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The present disclosure describes dual barometer systems and methods of use thereof for improved altitude estimation.

A dual barometer system as described herein comprises a mobile unit and a reference unit, each having a barometric pressure sensor. The barometric pressure sensor at the mobile unit can measure the local atmospheric pressure at the location of the mobile unit, while the barometric pressure sensor at the reference unit can measure the reference atmospheric pressure at the location of the reference unit. The mobile unit and the reference unit can be configured to remain within a predetermined horizontal distance from one another throughout operation of the mobile unit, for example such that the reference unit is subject to substantially similar weather conditions as the mobile unit throughout movement of the mobile unit. Therefore, the barometric pressure sensor at the reference unit can be subject to substantially similar effects of weather on atmospheric pressure measurement as the barometric pressure sensor at the mobile unit. The altitude of the mobile unit may be determined based on both the local and reference atmospheric pressure measurements, wherein the reference atmospheric pressure measurement is used to correct the estimation of altitude of the mobile unit based on the local atmospheric pressure measurement.

A dual barometer system as described herein can compensate for the effects of variable weather conditions on altitude estimation, while offering several additional advantages. The dual barometer system can be substantially unlimited in the locations in which the system may be used, since both the reference unit and the mobile unit can be moved to a desired location of use. The dual barometer system is self-contained, operable without having to rely on a network of infrastructure that may not be under the control of the user of the mobile unit for reference data. For example, unlike systems that rely solely on a global positioning system (GPS) to determine the altitude of a mobile unit, the dual barometer system described herein does not need to rely on external signals that may be prone to interruptions (e.g., due to the location of the mobile unit, weather conditions, etc.). The dual barometer system can be relatively simple to implement and thus highly robust, less prone to failure compared to systems comprising numerous subcomponents and requiring complicated computational algorithms to generate corrected altitude estimations.

Any description of a dual barometer system herein may also apply to a barometer system comprising more than two barometric pressure sensors. For example, the system may comprise a plurality of reference units associated with a single reference unit, a single reference unit associated with a plurality of reference units, or a plurality of reference units associated with a plurality of reference units, wherein each reference unit or mobile unit comprises a barometric pressure sensor. A plurality of reference units of a system may comprise reference units positioned at different locations. For example, the plurality of reference units may comprise one or more movable reference units (e.g., remote controller of a remotely controlled vehicle), one or more reference units at fixed positions at the ground level, or a combination thereof. Wherein the system comprises a plurality of reference units, the system may be configured to detect one or more reference units that are positioned closest to the location of the mobile unit, and use the information generated by the reference units in determining the altitude of the mobile unit. Alternatively or in combination, the system may be configured to use an average of a plurality of reference measurements generated by a plurality of reference units in relative proximity to the mobile unit. The system may be further configured to determine outliers, if any, among the plurality of reference measurements, and exclude the outliers in calculating the altitude of the mobile unit.

A dual barometer system as described herein may generate an estimated altitude of a mobile unit with an accuracy comparable to the accuracy of a barometric altimeter used under optimal conditions (e.g., normal weather conditions). For example, a difference between an estimated altitude generated by the dual barometer system and the true altitude of the mobile unit may be less than 30 meters, 20 meters, 10 meters, 5 meters, 4 meters, 3 meters, 2 meters, 1 meter, 0.5 meter, 0.1 meter, 0.05 meter or 0.01 meter.

Figure 1:
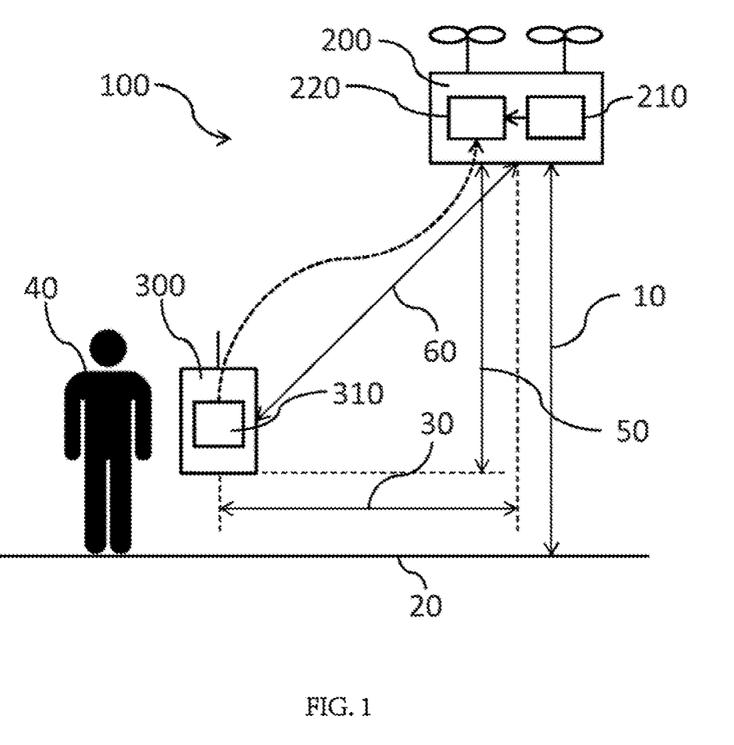
FIG. 1 illustrates an exemplary configuration of a dual barometer system for determining an altitude of a mobile unit.

Referring now to the drawings, FIG. 1 illustrates an exemplary configuration of a dual barometer system 100 for determining an altitude of a mobile unit. The system comprises a mobile unit 200 and a reference unit 300. The mobile unit comprises a local barometric pressure sensor 210, and the reference unit comprises a reference barometric pressure sensor 310. The local barometric pressure is configured to measure the atmospheric pressure at the location of the mobile unit, while the reference barometric pressure sensor is configured to measure the atmospheric pressure at the location of the reference unit. The system further comprises one or more processors individually or collectively configured to estimate the altitude 10 of the mobile unit based on the local and reference atmospheric pressure, as described in further detail herein. For example, the mobile unit may comprise a mobile unit processor 220, configured to obtain the local atmospheric pressure from the local barometric pressure sensor, obtain the reference atmospheric pressure from the reference barometric pressure sensor, and produce the estimated altitude of the mobile unit based on the local and reference measurement data. Numerous other variations of the system configuration are possible, some of which are described in further detail herein in reference to FIGS. 2 and 3.

The mobile unit 200 may comprise any movable object, such as a ground vehicle, an aerial vehicle, or a mobile computing device such as a laptop, tablet, or smartphone. The movable object may be configured to change an altitude thereof during movement of the object. For example, the movable object may be a ground or aerial vehicle configured to travel a vertical distance of at least 5 meters, at least 10 meters, at least 25 meters, at least 50 meters, at least 100 meters, or any other vertical distance of travel that may cause a change in atmospheric pressure experienced by the movable object. Additional attributes of a movable object suitable for incorporation with embodiments are described in further detail elsewhere herein.

The reference unit 300 may comprise any unit that can provide reference data with respect to the movable object. The reference unit may be handheld or worn by a user of the mobile unit, or the reference unit may rely on other members for support. The reference unit may be configured to move or remain in fixed in position during movement of the mobile unit. For example, the user carrying or otherwise supporting the reference unit may move during movement of the mobile unit, or a support member of the mobile unit may be configured to transport the reference unit during movement of the mobile unit (e.g., the support member may be self-propelled). During movement of the mobile unit, the reference unit may remain substantially at ground level, at sea level, or at a known altitude with respect to ground level or sea level. Alternatively, the reference unit may be assumed to remain substantially at ground level or at sea level in determining the altitude of the mobile unit. The reference unit may comprise a remote control device, such as a remote controller of an unmanned aerial vehicle (UAV). Additional attributes of a remote controller suitable for incorporation with embodiments are described in further detail elsewhere herein.

The barometric pressure sensor 210 or 310 may comprise any barometric pressure sensor as known in the art. For example, a barometric sensor may comprise an aneroid barometer configured to measure the atmospheric pressure from a static port outside an aircraft. An aneroid altimeter may be calibrated to measure the pressure directly as an altitude above mean sea level, in accordance with a mathematical model defined by the International Standard Atmosphere (ISA). A barometric pressure sensor may comprise a sensitive altimeter, wherein the sea-level reference pressure can be adjusted with a setting input. A barometric pressure sensor may comprise a microelectromechanical systems (MEMS) barometer, created via photolithography or photochemical machining. A barometric pressure sensor may comprise a sensor based on MEMS and piezoresistive pressure-sensing technologies. The dual barometer system may comprise a single type of barometric pressure sensor for all devices in the system, or the system may comprise two or more different types of barometric pressure sensors, where at least some of the devices in the system may comprise different types of sensors.

The reference unit 300 may be configured to transmit the measurement data produced by the reference barometric pressure sensor 310 to the mobile unit processor 220 over a wireless connection. The reference unit and the mobile unit may be configured to transmit and/or receive data using one or more of many methods. The method may comprise direct communication, wherein data is transmitted directly between the reference unit and the mobile unit, or the method may comprise indirect communication, wherein data is transmitted via one or more intermediate network nodes such as relay stations, towers, satellites, mobile stations, computers, servers, and the like. For example, the reference unit and the mobile unit may be configured to transmit and/or receive data using WiFi, WiMAX, coded orthogonal frequency-division multiplexing (COFDM), mobile or cellular phone networks (e.g., 3G or 4G networks), or a wireless serial communication link such as Bluetooth™.

The estimated altitude may comprise the altitude of the mobile unit above sea level, or it may comprise the height of the mobile unit above ground 20. Wherein the ground 20 is substantially at sea level, the altitude 10 may be equal to both the altitude above sea level and the height above ground. Optionally, the system may be configured such that the user can select whether the estimated altitude is generated in terms of altitude above sea level or height above ground.

The reference unit may be movable, so that it may be moved to a desired location of use of the mobile unit. For example, as shown in FIG. 1, the mobile unit may comprise an unmanned aerial vehicle (UAV), and the reference unit may comprise the remote controller of the UAV, wherein the remote controller may be moved to a location of launch of the UAV by a user 10. In another exemplary system, the mobile unit may comprise a smartphone carried by a user, and the reference unit may be a compact, portable measurement device that can be left in an appropriate reference location with respect to the user's location during a period of time. For example, a user may carry his smartphone while on hike, and leave a measurement device comprising the reference sensor in his car, wherein the hiking trail is within walking distance of the car.

In some embodiments, the reference unit remains within a predetermined horizontal distance 30 and/or a predetermined direct distance 60 from the mobile unit, throughout the operation of the mobile unit. The predetermined horizontal or direct distance may be any distance at which the reference unit and the mobile unit may reasonably be assumed to experience substantially similar weather conditions. For example, the predetermined horizontal or direct distance may comprise a geographical area having substantially uniform weather conditions. Therefore, within the predetermined horizontal or direct distance, the local and reference barometric pressure sensors may be subject to substantially similar weather-induced changes in atmospheric pressure. For example, the horizontal distance 30 or the direct distance 60 may be about 1 kilometer, less than 1 kilometer, less than 5000 meters, less than 2500 meters, less than 1000 meters, less than 800 meters, or less than 500 meters. Optionally, at any point before or during the movement of the mobile unit, the reference unit may be moved, automatically or manually by a user, to remain within the predetermined horizontal or direct distance from the mobile unit. For example, the reference unit and the mobile unit may each comprise a global positioning system (GPS) configured to track its location, and the reference unit may be configured to receive the position information of the mobile unit, such that the reference unit can determine the horizontal or direct distance between the reference unit and the mobile unit. If the determined distance exceeds a predetermined distance limit, the reference unit may signal an alert to the user to move the reference the unit, or may automatically move to remain within the predetermined horizontal or direct distance (e.g., by means of a support member configured to transport the reference unit).

In embodiments wherein the reference unit comprises a remote controller of a remotely controlled vehicle, the reference unit may be configured to remain within a distance 30 or 60 that is less than or equal to the communication distance between the remote controller and the remotely controlled vehicle, wherein the remote controller transmits operational commands to the mobile unit only within the communication distance. In such configurations, the mobile unit may be unable to travel beyond the predetermined horizontal or direct distance from the remote controller. The remote controller may be configured to transmit operational commands to the mobile unit via a wireless connection, wherein the same wireless connection may also be used to transmit measurement data between the remote controller and the mobile unit. In such configurations, the wireless connection can be an encrypted, direct communication link as described herein.

The mobile unit may be configured to remain within a predetermined vertical distance 50 from the reference unit throughout the operation of the mobile unit. The predetermined vertical distance may be any distance at which the reference unit and the mobile unit may reasonably be assumed to experience substantially similar weather conditions. Therefore, within the predetermined vertical distance, the local and reference barometric pressure sensors may be subject to substantially similar weather-induced changes in atmospheric pressure. For example, the vertical distance 50 may be about 1000 meters, less than 1000 meters, less than 800 meters, or less than 500 meters. In embodiments wherein the reference unit comprises a remote controller of a remotely controlled vehicle, the reference unit may remain within a vertical distance 50 that is less than or equal to the communication distance between the remote controller and the remotely controlled vehicle.

Figure 2:
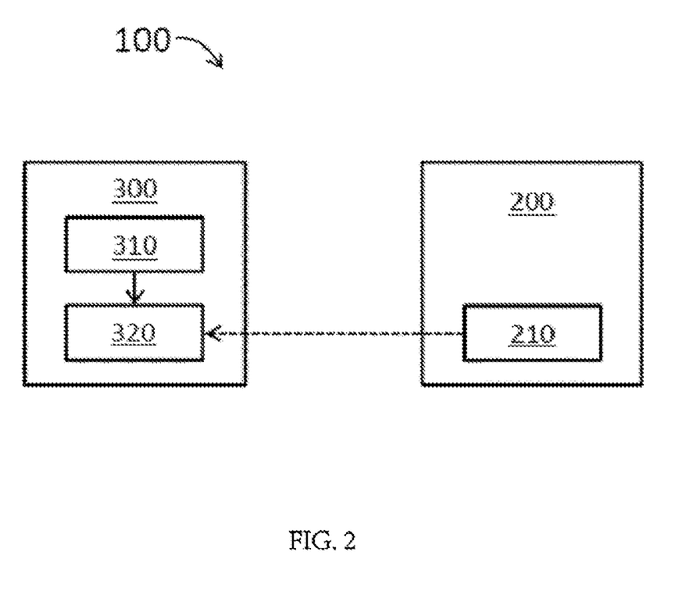
FIG. 2 is a schematic diagram of an alternative configuration of a dual barometer system for estimating the altitude of a mobile unit.

FIG. 2 is a schematic diagram of an alternative configuration of a dual barometer system 100 for estimating the altitude of a mobile unit. In this configuration, the reference unit 300 comprises a reference unit processor 320, configured to determine the estimated altitude of the mobile unit based on local and reference atmospheric pressure. The reference unit processor is configured to obtain measurement data from the reference barometric pressure sensor 310 and the local barometric pressure sensor 210 of the mobile unit 200. The mobile unit may be configured to transmit the measurement data produced by the local barometric pressure sensor to the reference unit processor over a wireless connection, using one or more communication methods as described herein.

Figure 3:
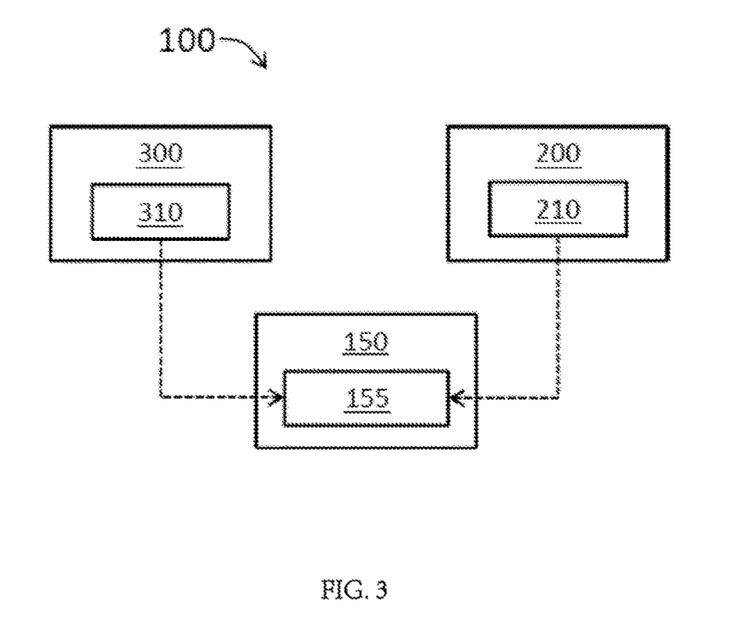
FIG. 3 is a schematic diagram of an alternative configuration of a dual barometer system for estimating the altitude of a mobile unit.

FIG. 3 is a schematic diagram of an alternative configuration of a dual barometer system 100 for estimating the altitude of a mobile unit. The dual barometer system may further comprise a server 150 in communication with the reference unit 300 and the mobile unit 200 over a wireless connection, using any wireless communication method as described herein. The server may be positioned at ground level at a fixed position. The server may be a standalone unit comprising a physical server, or the server may be a cloud server. The server may be a computing device connected to the reference unit and/or the mobile unit via a peer-to-peer network. The server may comprise a server processor 155, configured to estimate the altitude of the mobile unit based on local and reference atmospheric pressure. The mobile unit and the reference unit may be configured to transmit the measurement data produced by the local barometric pressure sensor 210 and the reference barometric pressure sensor 310, respectively, to the server processor over the wireless connection.

Other configurations of the dual barometer system are also possible. For example, both the mobile unit and the reference unit may comprise processors configured with instructions to determine the altitude of the mobile unit. The mobile unit processor and the reference unit processor may each be configured to perform different steps of the altitude calculation, and/or they may be configured to perform same steps. The mobile unit processor or the reference unit processor may be integrated with a sensor of the mobile unit or the reference unit, respectively. For example, the mobile unit processor or the reference unit processor may be integrated with the local atmospheric pressure sensor or the reference atmospheric pressure sensor, respectively, or with other sensors disposed on the mobile unit or the reference unit, as described herein (e.g., temperature sensors, global positioning systems (GPS), etc.). In configurations including a server in communication with the mobile unit and/or the reference unit, any or all of the mobile unit, reference unit, and server may comprise a processor configured to perform all or a portion of the steps of the altitude calculation.

In some embodiments, a single reference unit may be associated with a plurality of mobile units. For example, the single reference unit may comprise a remote controller configured to control operation of a plurality of mobile units such as UAVs. In such configurations, the processor of each of the plurality of mobile units may be configured to determine the altitude of the mobile unit based on the local atmospheric pressure generated at the mobile unit and the reference data generate at the single reference unit (e.g., the single remote controller).

Optionally, the mobile unit and the reference unit may further comprise one or more additional sensors configured to measure factors other than atmospheric pressure. For example, the mobile unit and the reference unit may further comprise temperature sensors, wherein the local temperature sensor of the mobile unit is configured to measure the local temperature at the location of the mobile unit, and the reference temperature sensor of the reference unit is configured to measure the reference temperature at the location of the reference unit. Local and reference temperature data may be used in the determination of the estimated altitude of the mobile unit by the processor, as described in further detail herein. For example, temperature data may affect an interpretation of atmospheric pressure data in determining an altitude. A global positioning system (GPS) is another example of a type of sensor that may be suitable for incorporation with the dual barometer system. The positional data of the mobile unit and/or the reference unit generated by the GPS may be used to further improve the accuracy of altitude estimation by the processor. The mobile unit and/or the reference unit may be further configured to transmit to a processor the measurement data generated by the one or more additional sensors, along with the atmospheric pressure data generated by the barometric pressure sensors. In some embodiments, one or more of the additional sensors may be integrated with the barometric pressure sensor.

The processor may be configured with instructions to estimate the altitude of the mobile unit using one of many methods, as described in further detail herein. In some of these methods, the local or reference barometric pressure sensor may be configured to perform a simple calculation to convert the measured atmospheric pressure to a corresponding altitude. Such a conversion calculation can be based on a calibration algorithm that is specific to a particular type of barometric pressure sensor, wherein the calibration algorithm may be provided by the manufacturer of the barometric pressure sensor. For example, a barometric pressure sensor comprising an integrated temperature sensor may be configured to convert measured atmospheric pressure to a corresponding altitude based on the following equation:

$$H=18400*(1+T/273)*\log(101.32/P)$$

wherein H is the altitude, T is the temperature in Celsius, and P is the atmospheric pressure measured by the barometric pressure sensor. In some embodiments, the local or barometric pressure sensors may comprise sensors that are factory-configured to automatically perform the conversion and output altitude values rather than atmospheric pressure values.

Figure 4:
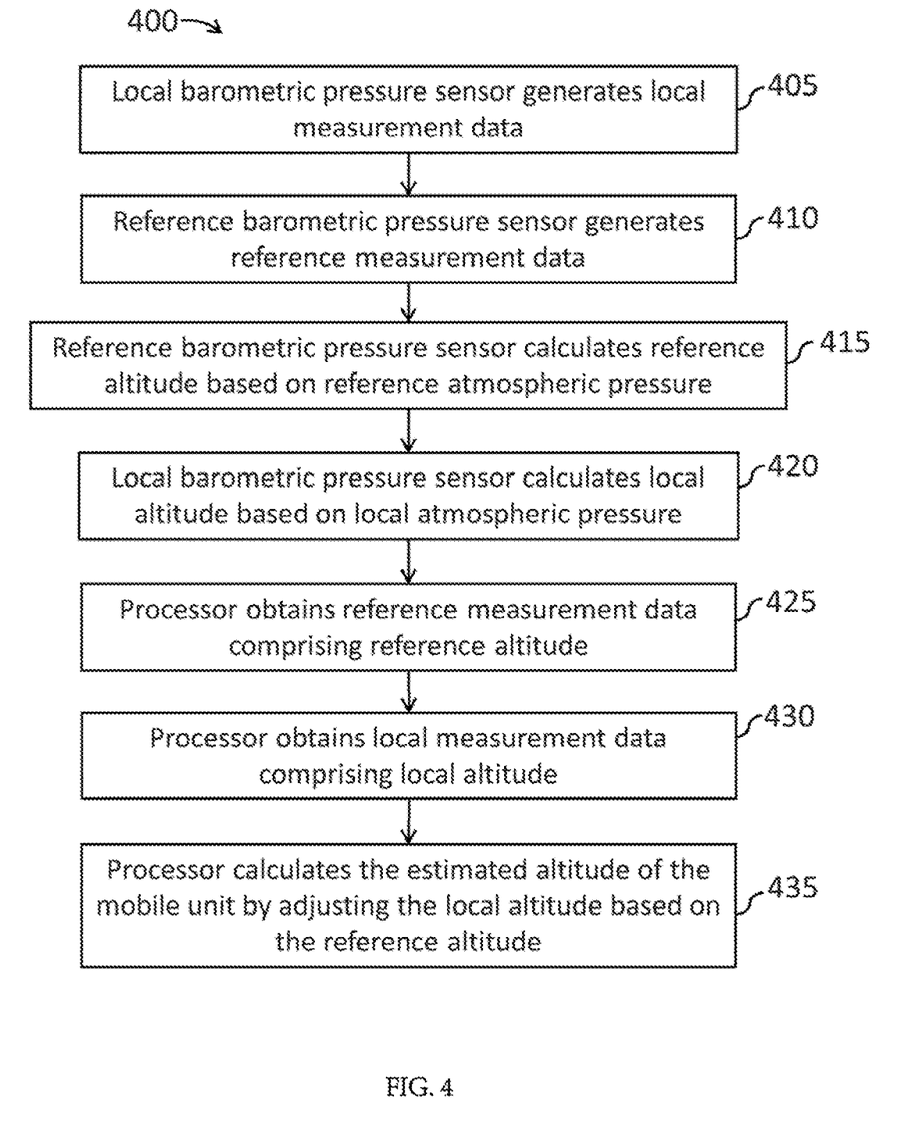
FIG. 4 illustrates an exemplary method of estimating the altitude of the mobile unit using a dual barometer system as described herein.

FIG. 4 illustrates an exemplary method 400 of estimating the altitude of the mobile unit using a dual barometer system as described herein. At step 405, the local barometric pressure sensor may generate local measurement data comprising the local atmospheric pressure at the location of the mobile unit. At step 410, the reference barometric pressure sensor may generate reference measurement data comprising the reference atmospheric pressure at the location of the reference unit. At step 415, the reference barometric pressure sensor may calculate a reference altitude, based on the reference atmospheric pressure. For example, the reference barometric pressure sensor may be configured to convert atmospheric pressure to a reference altitude using a conversion equation stored thereon, as described in further detail herein. At step 420, the local barometric pressure sensor may calculate a local altitude based on the local atmospheric pressure. For example, the local barometric pressure sensor may be configured to convert atmospheric pressure to a local altitude using a conversion equation stored thereon, as described in further detail herein. At step 425, the processor may obtain the reference measurement data from the reference unit, wherein the reference measurement data comprises the reference altitude. At step 430, the processor may obtain the local measurement data from the mobile unit, wherein the local measurement data comprises the local altitude. At step 435, the processor may calculate the estimated altitude of the mobile unit, by adjusting the local altitude based on the reference altitude. For example, wherein the vertical position of the reference unit has not changed significantly throughout the operation of the mobile unit, the reference altitude may be subtracted from the local altitude to generate the estimated altitude of the mobile unit corrected for any weather-induced changes in atmospheric pressure.

Figure 5:
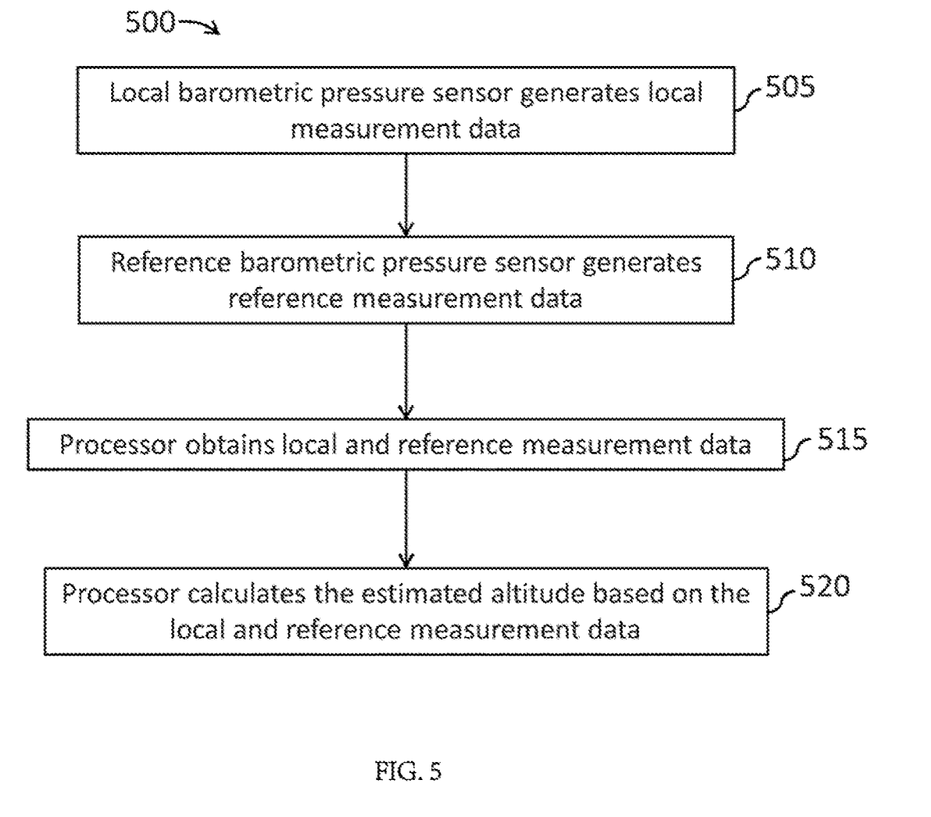
FIG. 5 illustrates another exemplary method of estimating the altitude of the mobile unit using a dual barometer system as described herein.

FIG. 5 illustrates another exemplary method 500 of estimating the altitude of the mobile unit using a dual barometer system as described herein. At step 505, the local barometric pressure sensor may generate local measurement data comprising the local atmospheric pressure at the location of the mobile unit. At step 510, the reference barometric pressure sensor may generate reference measurement data comprising the reference atmospheric pressure at the location of the reference unit. At step 515, the processor may obtain the local measurement data and the reference measurement data from the mobile unit and the reference unit, respectively. At step 520, the processor may calculate the estimated altitude of the mobile unit based on the local and reference measurement data. For example, the processor may calculate the difference in height between the reference unit and the mobile unit based on the reference atmospheric pressure and the local atmospheric pressure. Wherein the vertical position of the reference unit has not changed significantly throughout the operation of the mobile unit, the difference in height between the reference unit and the mobile unit may be assumed to be proportional to the altitude of the mobile unit. According to another exemplary method of calculating the estimated altitude of the mobile unit based on the local and reference measurement data, the processor may adjust the local measurement data based on the reference measurement data, and calculate the estimated altitude based on the adjusted local measurement data. For example, changes over time in the reference atmospheric pressure, wherein the vertical position of the reference unit has not changed significantly over time, may be subtracted from the local atmospheric pressure to generate adjusted local atmospheric pressure.

The steps of methods 400 and 500 are provided as examples of methods of estimating the altitude of the mobile unit using a dual barometer system as described herein. A person of ordinary skill in the art will recognize many variations and modifications of methods 400 and 500 based on the disclosure provided herein. For example, some steps may be added or removed. One or more steps may be performed in a different order than as illustrated in FIGS. 4 and 5. Some of the steps may comprise sub-steps. Many of the steps may be repeated as many times as appropriate or necessary.

The dual barometer system as described herein may be configured to generate the estimated altitude of the mobile unit at one or more time points, based on local and reference atmospheric pressure measurements generated at corresponding time points. For each local measurement generated by the local barometric pressure sensor at a local measurement time point, the reference barometric pressure sensor may be configured to generate a reference measurement at a corresponding reference measurement time point. The local and reference measurement time points may be substantially synchronized, or may be within 1 minute, within 30 seconds, within 10 seconds, within 1 second, within 0.1 second, within 0.01 second, within 0.001 second, or within 0.0005 second of one another. The processor may be configured to generate an estimated altitude of the mobile unit at each local measurement time point, based on the local measurement generated at that time point and the reference measurement generated at the corresponding reference measurement time point. Such a system configuration can improve the accuracy and reliability of the estimated altitude values derived therefrom, since the uncorrected local altitude derived from the local atmospheric pressure measurement can be adjusted based on a reference measurement taken at a closely-matched spatial position and point in time. Such a system confirmation can be particularly advantageous when the mobile unit is operated under rapidly changing weather conditions.

Alternatively, the dual barometer system may be configured to generate the estimated altitude of the mobile unit based on local and reference measurements generated at non-corresponding time points. The reference barometric pressure sensor may be configured to generate reference measurements at one or more predetermined reference measurement time points that do not correspond to local measurement time points. For example, the reference barometric pressure sensor may be configured to generate reference measurement data periodically at set intervals, such as at one or more fixed time points during a day regardless of when local measurements are generated. The processor may be configured generate the estimated altitude at a given time point based on the local measurement data the given time point, and the reference measurement data generated at a time point closest to the given time point. In another exemplary configuration, wherein the local barometric pressure sensor is configured to generate measurements at a plurality of local measurement time points throughout a specific time window, the reference barometric pressure sensor may be configured to generate measurements at reference measurement time points fewer than the local measurement time points. For example, the reference barometric pressure sensor may be configured to generate reference measurement data only at the beginning of the time window. For every local measurement time point thereafter, the estimated altitude may be determined based on the local measurement for the time point, and the single reference measurement generated at the beginning of the time window. Such a system configuration may be relatively less resource-intensive and simpler to implement, and may be necessary or appropriate if the system experiences an error in one or more aspects of components of the system. For example, if the data connection between reference unit and the mobile unit is weak or becomes interrupted during the operation of the mobile unit, the processor may not be able to obtain the reference measurement corresponding to a local measurement, and may need to rely on the most recently generated reference measurement to generate the estimated altitude.

The dual barometer system as described herein may be configured to generate the estimated altitude of a mobile unit at a plurality of time points throughout a specific time window. For example, the system may be configured to generate the estimated altitude automatically at a plurality of time points throughout a time window corresponding to a trip taken by a mobile unit. The system may be configured to generate the estimated altitude at the beginning of the trip (e.g., before or shortly after the mobile unit begins to move) and at a plurality of predetermined intervals thereafter, throughout the duration of the trip. In another exemplary configuration, the system may begin to generate altitude estimations in response to a user request to begin altitude measurement, and stop generating the estimations in response to a user request to end altitude measurement. In any configuration of the system wherein a plurality of altitude estimations is generated throughout a specific time window, the plurality of estimations may be generated at predetermined intervals that may be, for example, less than 1 minute, less than 30 seconds, less than 10 seconds, less than 1 second, less than 0.1 second, less than 0.01 second, less than 0.001 second, or less than 0.0005 second. Optionally, the system may be configured to allow the user to set the predetermined interval of measurement of a plurality of data points.

The dual barometer system as described herein may also be configured to generate a single altitude estimation in response to a one-time user request.

The mobile unit and reference unit may be configured to transmit and/or receive data to or from one another in real time, or substantially in real time with minimal time delay, with respect to the measurement of data by the local sensor (e.g., within 1 second, within 0.1 second, or within 0.01 second of measurement). Alternatively, mobile unit and reference unit may be configured to transmit and/or receive data to or from one another periodically at set intervals.

The processor may be configured to generate the estimated altitude in real time or substantially in real time with minimal time delay, with respect to the obtaining of the measurement data (e.g., within 1 second, within 0.1 second, or within 0.01 second of obtaining the measurement data). Alternatively, the processor may be configured to generate the estimated altitude periodically at set intervals.

Optionally, a dual barometer system may further incorporate a third party data source to obtain additional information relating to the local area of operation of the mobile unit. For example, one or more processors in the system or one or more processors in communication with a device in the system may be configured to connect to and browse the World Wide Web ("the web") in a methodical, automated manner to collect information relating to the local area of operation. The information may include, for example, weather information such as temperature, wind, or precipitation. This information may be incorporated into the calculations performed by one or more processors of the system to determine the altitude of the mobile unit.

A barometric pressure sensor as described herein may be disposed on any appropriate location on the mobile unit or the reference unit. For example, the sensor may be disposed on an external surface or an internal surface of a housing of the mobile unit or the reference unit. The sensor may be disposed in an appropriate position and orientation for sensing the atmospheric pressure. For example, the sensor or components thereof may be exposed to the ambient air, wind, precipitation, updraft, or downdraft surrounding the mobile unit or the reference unit. The sensor may be covered with protective material, such as a piece of foam, to diminish the effects of wind over the chip.

Wherein the mobile unit comprises an unmanned aerial vehicle (UAV) or any other aerial vehicle, the barometric pressure sensor can be positioned on or near one or more structures of the UAV. For example, the sensor can be located directly on an outer or inner surface of the UAV body. The sensor can be located inside a cavity of the UAV formed by the body of the vehicle. The sensor can be located on an extension member of the vehicle, such as a support member of the vehicle (e.g., a landing stand or a pair of landing stands). For example, the sensor can be located on a surface of a landing stand that is oriented internally, such that the sensor is shielded from the effects of the wind and precipitation. The sensor can be located on a surface of a propulsion mechanism, such as a rotor blade. The sensor can be located on a payload carried by the UAV, or on a surface of a carrier mechanism coupling the payload to the UAV.

Figure 6:
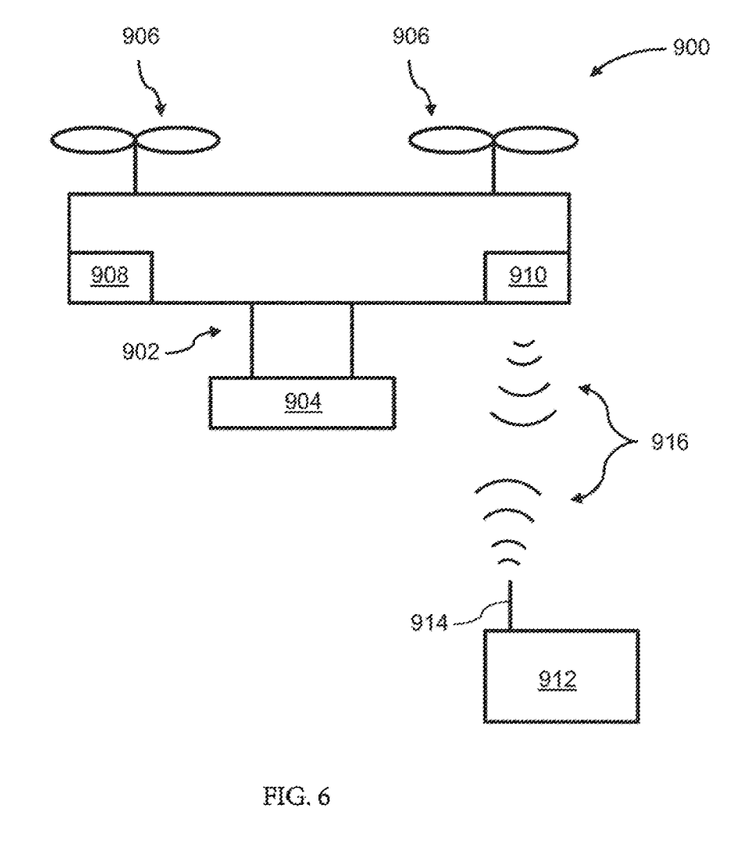
FIG. 6 illustrates a movable object including a carrier and a payload, which may comprise a mobile unit of a dual barometer system described herein.

FIG. 6 illustrates an exemplary mobile unit and reference unit suitable for incorporation with embodiments. The mobile unit may comprise a movable object 900 including a carrier 902 and a payload 904. The reference unit may comprise a terminal 912 in communication with the mobile unit. Although the movable object 900 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV).

The movable object 900 may include propulsion mechanisms 906, a sensing system 908, and a communication system 910. The propulsion mechanisms 906 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 906 can enable the movable object 900 to take off vertically from a surface or land vertically on a surface without requiring any horizontal movement of the movable object 900 (e.g., without traveling down a runway). Optionally, the propulsion mechanisms 906 can be operable to permit the movable object 900 to hover in the air at a specified position and/or orientation.

For example, the movable object 900 can have multiple horizontally oriented rotors that can provide lift and/or thrust to the movable object. The multiple horizontally oriented rotors can be actuated to provide vertical takeoff, vertical landing, and hovering capabilities to the movable object 900. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 900 (e.g., with respect to up to three degrees of translation and up to three degrees of rotation).

In some embodiments, the movable object 900 can be configured to carry a payload 904. The payload can be provided within a housing. The housing may be separate from a housing of the movable object, or be part of a housing for a movable object. Alternatively, the payload can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

The payload 904 can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the payload 904 may be provided on the movable object 900 via a carrier 902. The payload can be coupled to the movable object via the carrier, either directly (e.g., directly contacting the movable object) or indirectly (e.g., not contacting the movable object). Optionally, the payload can be releasably coupled to the carrier. Alternatively, the payload 904 can be mounted on the movable object 900 without requiring a carrier 902. The payload can be integrally formed with the carrier.

The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components.

The sensing system 908 can include one or more sensors that may sense the spatial disposition, velocity, and/or acceleration of the movable object 900 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 908 can be used to control the spatial disposition, velocity, and/or orientation of the movable object 900 (e.g., using a suitable processing unit and/or control module, as described below). Alternatively, the sensing system 908 can be used to provide data regarding the environment surrounding the movable object, such as weather conditions, proximity to potential obstacles, location of geographical features, location of manmade structures, and the like. The sensing system may comprise a barometric pressure sensor as described herein, wherein the sensing data provided by the barometric pressure sensor is used to determine the altitude of the mobile unit as described herein.

In some embodiments, the movement of the movable object, carrier, and payload relative to a fixed reference frame (e.g., the surrounding environment) and/or to each other, can be controlled by a terminal 912. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal). The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

The terminal can comprise the reference unit as described herein, configured to provide reference atmospheric pressure data for the determination of the altitude of the mobile unit. The terminal can comprise a reference barometric pressure sensor configured to measure the atmospheric pressure at the location of the terminal, as described herein. The reference measurement data generated by the barometric pressure sensor may be communicated to one or both of the movable object and a server. Alternatively, the terminal may be configured to receive measurement data generated from sensors located on other devices in the system, and calculate the altitude of the mobile unit, as described herein.

The communication system 910 enables communication with terminal 912 having a communication system 914 via wireless signals 916. The communication systems 910, 914 may include any number of transmitters, receivers, and/or transceivers suitable for wireless communication. The communication may be one-way communication, such that data can be transmitted in only one direction. For example, one-way communication may involve only the movable object 900 transmitting data to the terminal 912, or vice-versa. The data may be transmitted from one or more transmitters of the communication system 910 to one or more receivers of the communication system 912, or vice-versa. Alternatively, the communication may be two-way communication, such that data can be transmitted in both directions between the movable object 900 and the terminal 912. The two-way communication can involve transmitting data from one or more transmitters of the communication system 910 to one or more receivers of the communication system 914, and vice-versa.

In some embodiments, the terminal 912 can provide control data to one or more of the movable object 900, carrier 902, and payload 904 and receive information from one or more of the movable object 900, carrier 902, and payload 904 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 906), or a movement of the payload with respect to the movable object (e.g., via control of the carrier 902). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 908 or of the payload 904). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 912 can be configured to control a state of one or more of the movable object 900, carrier 902, or payload 904. Alternatively or in combination, the carrier 902 and payload 904 can also each include a communication module configured to communicate with terminal 912, such that the terminal can communicate with and control each of the movable object 900, carrier 902, and payload 904 independently.

In some embodiments, the movable object 900 can be configured to communicate with another remote device in addition to the terminal 912, or instead of the terminal 912. The terminal 912 may also be configured to communicate with another remote device as well as the movable object 900. For example, the movable object 900 and/or terminal 912 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 900, receive data from the movable object 900, transmit data to the terminal 912, and/or receive data from the terminal 912. Optionally, the remote device can be connected to the Internet or other telecommunications network, such that data received from the movable object 900 and/or terminal 912 can be uploaded to a website or server.

Figure 7:
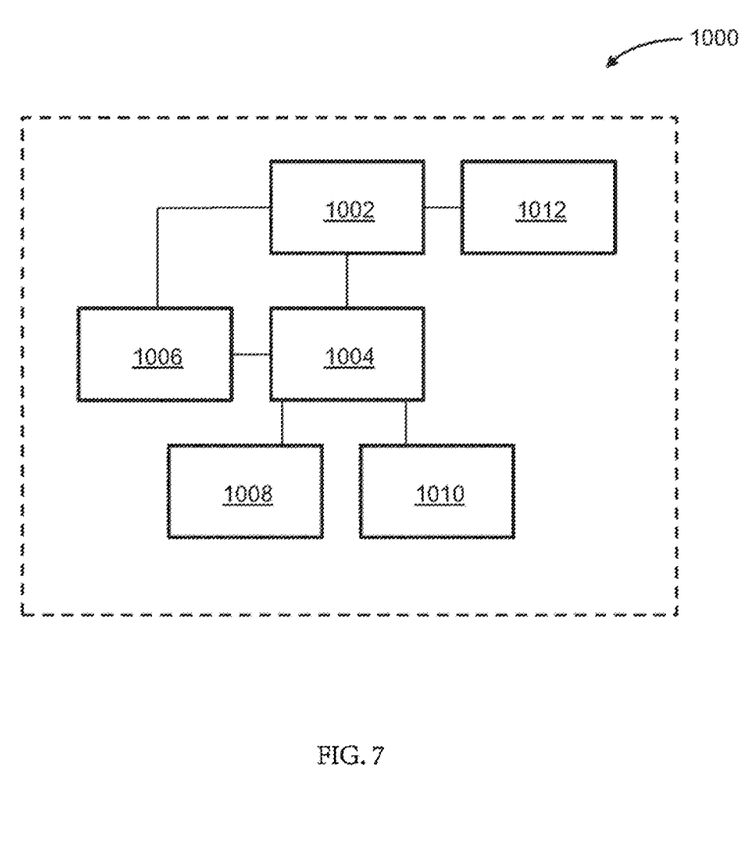
FIG. 7 is a schematic illustration by way of block diagram of a system for controlling an movable object, in accordance with embodiments.

FIG. 7 is a schematic illustration by way of block diagram of a system 1000 for controlling an movable object, in accordance with embodiments. The system 1000 can be used in combination with any suitable embodiment of the systems, devices, and methods disclosed herein. The system 1000 can include a sensing module 1002, processing unit 1004, non-transitory computer readable medium 1006, control module 1008, and communication module 1010.

The sensing module 1002 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1002 can be operatively coupled to a processing unit 1004 having a plurality of processors. In some embodiments, the sensing module can be operatively coupled to a transmission module 1012 (e.g., a Wi-Fi image transmission module) configured to directly transmit sensing data to a suitable external device or system. For example, the transmission module 1012 can be used to transmit images captured by a camera of the sensing module 1002 to a remote terminal.

The processing unit 1004 can have one or more processors, such as a programmable processor (e.g., a central processing unit (CPU)). The processing unit 1004 can be operatively coupled to a non-transitory computer readable medium 1006. The non-transitory computer readable medium 1006 can store logic, code, and/or program instructions executable by the processing unit 1004 for performing one or more steps. The non-transitory computer readable medium can include one or more memory units (e.g., removable media or external storage such as an SD card or random access memory (RAM)). In some embodiments, data from the sensing module 1002 can be directly conveyed to and stored within the memory units of the non-transitory computer readable medium 1006. The memory units of the non-transitory computer readable medium 1006 can store logic, code and/or program instructions executable by the processing unit 1004 to perform any suitable embodiment of the methods described herein. For example, the processing unit 1004 can be configured to execute instructions causing one or more processors of the processing unit 1004 to analyze sensing data produced by the sensing module. The memory units can store sensing data from the sensing module to be processed by the processing unit 1004. In some embodiments, the memory units of the non-transitory computer readable medium 1006 can be used to store the processing results produced by the processing unit 1004.

In some embodiments, the processing unit 1004 can be operatively coupled to a control module 1008 configured to control a state of the movable object. For example, the control module 1008 can be configured to control the propulsion mechanisms of the movable object to adjust the spatial disposition, velocity, and/or acceleration of the movable object with respect to six degrees of freedom. Alternatively or in combination, the control module 1008 can control one or more of a state of a carrier, payload, or sensing module.

The processing unit 1004 can be operatively coupled to a communication module 1010 configured to transmit and/or receive data from one or more external devices (e.g., a terminal, display device, or other remote controller). Any suitable means of communication can be used, such as wired communication or wireless communication, as described in further detail below. The communication module 1010 can transmit and/or receive one or more of sensing data from the sensing module 1002, processing results produced by the processing unit 1004, predetermined control data, user commands from a terminal or remote controller, and the like. In some embodiments, the communication module 1010 can be configured to implement adaptive communication mode switching, as described elsewhere herein.

The components of the system 1000 can be arranged in any suitable configuration. For example, one or more of the components of the system 1000 can be located on the movable object, carrier, payload, terminal, sensing system, or an additional external device in communication with one or more of the above. Additionally, although FIG. 7 depicts a single processing unit 1004 and a single non-transitory computer readable medium 1006, one of skill in the art would appreciate that this is not intended to be limiting, and that the system 1000 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1000 can occur at one or more of the aforementioned locations.

While illustrative embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An apparatus for determining an altitude of an unmanned aerial vehicle (UAV) at a plurality of local measurement time points, the apparatus comprising:
   one or more processors, individually or collectively configured to:
      at each of the plurality of local measurement time points, obtain local measurement data comprising a local atmospheric pressure at a location of the UAV,
      obtain reference measurement data comprising a reference atmospheric pressure at a location of a reference unit, the UAV and the reference unit configured to remain within a predetermined operational distance from one another throughout operation of the UAV, and the reference unit configured to control operation of the UAV, and
      at each of the plurality of local measurement time points, determine the altitude of the UAV based on the local measurement data at the local measurement time point and the reference measurement data obtained by the reference unit.

2. The apparatus of claim 1, wherein:
   the local measurement data comprises a local altitude determined based on the local atmospheric pressure,
   the reference measurement data obtained by the reference unit comprises a reference altitude determined based on the reference atmospheric data obtained by the reference unit, and the one or more processors are further configured to determine the altitude of the UAV by adjusting the local altitude based on the reference altitude obtained by the reference unit.

3. The apparatus of claim 1, wherein the one or more processors are further configured to adjust the local measurement data based on the reference measurement data obtained by the reference unit to obtain adjusted local measurement data, and determine the altitude of the UAV based on the adjusted local measurement data.

4. The apparatus of claim 1, wherein the reference unit is movable to remain within a predetermined horizontal distance from the UAV.

5. The apparatus of claim 1, wherein:
the reference measurement data comprises the reference atmospheric pressures obtained at a plurality of reference measurement time points corresponding to the plurality of local measurement time points, and
the one or more processors are further configured to determine the altitude of the UAV at each of the plurality of local measurement time points, based on the local measurement data at the local measurement time point and the reference measurement data obtained by the reference unit at a reference measurement time point corresponding to the local measurement time point.

6. The apparatus of claim 1, wherein:
the local measurement data further comprises a local temperature at the location of the UAV, and
the reference measurement data further comprises a reference temperature at the location of the reference unit.

7. The apparatus of claim 6, wherein:
the UAV comprises a local temperature sensor configured to measure the local temperature, and
the reference unit includes a reference temperature sensor configured to measure the reference temperature.

8. The apparatus according to claim 1, wherein the processors are further configured to, for each local measurement time point:
receive a first Global Positioning System (GPS) signal from a first GPS device configured on the UAV;
receive a second GPS signal from a second GPS device configured on the reference unit; and
adjust the determined altitude of the UAV using the first GPS signal and the second GPS signal.

9. A method for determining an altitude of an unmanned aerial vehicle (UAV) at a plurality of local measurements time points, the method comprising:
at each of the plurality of local measurement time points, obtaining local measurement data comprising a local atmospheric pressure at a location of the UAV;
obtaining reference measurement data comprising a reference atmospheric pressure at a location of a reference unit, the UAV and the reference unit configured to remain within a predetermined operational distance from one another throughout operation of the UAV, and the reference unit configured to control operation of the UAV; and
at each of the plurality of local measurement time points, determining the altitude of the UAV based on the local measurement data obtained at the local measurement time point and the reference measurement data obtained by the reference unit.

10. The method of claim 9, wherein:
the local measurement data comprises a local altitude determined based on the local atmospheric pressure,
the reference measurement data obtained by the reference unit comprises a reference altitude determined based on the reference atmospheric data obtained by the reference unit, and
determining the altitude of the UAV comprises adjusting the local altitude based on the reference altitude obtained by the reference unit.

11. The method of claim 9, further comprising:
adjusting the local measurement data based on the reference measurement data obtained by the reference unit to obtain adjusted local measurement data,
wherein the altitude of the UAV is determined based at least on the adjusted local measurement data.

12. The method of claim 9, wherein:
the reference measurement data comprises the reference atmospheric pressures obtained at a plurality of reference measurement time points corresponding to the plurality of local measurement time points, and
determining the altitude of the UAV includes determining the altitude of the UAV at each of the plurality of local measurement time points, based on the local measurement data at the local measurement time point and the reference measurement data obtained by the reference unit at a reference measurement time point corresponding to the local measurement time point.

13. The method of claim 12, wherein each local measurement time point is synchronized with one corresponding reference measurement time point.

14. The method of claim 9, wherein:
the local measurement data further comprises a local temperature at the location of the UAV, and
the reference measurement data further comprises a reference temperature at the location of the reference unit.

15. The method of claim 14, wherein:
the UAV comprises a local temperature sensor configured to measure the local temperature, and
the reference unit comprises a reference temperature sensor configured to measure the reference temperature.

16. The method of claim 9, wherein the UAV and the reference unit are configured to transmit data to or receive data from one another via a wireless connection comprising one or more of a cellular communication network, a wireless serial communication link, or an Internet or Internet-based network.

17. The method of claim 9, wherein the UAV and the reference unit are configured to transmit data to or receive data from one another in real time, and the altitude of the UAV is instantaneously determined.

18. The method of claim 9, wherein the UAV and the reference unit are configured to generate the local and reference measurement data and determine the altitude of the UAV periodically at predetermined intervals during movement of the UAV.

19. The method of claim 9, wherein the UAV and the reference unit are configured to generate the local and reference measurement data and determine the altitude of the UAV at user request.

\* \* \* \* \*